June 28, 1960 W. J. FAULKNER 2,942,488

PHONOGRAPH DRIVE MECHANISM

Filed June 19, 1956 2 Sheets-Sheet 1

INVENTOR.
WILLARD J. FAULKNER
BY
Lockwood, Galt, Woodard, & Smith
ATTORNEYS

June 28, 1960 W. J. FAULKNER 2,942,488

PHONOGRAPH DRIVE MECHANISM

Filed June 19, 1956 2 Sheets-Sheet 2

INVENTOR.
WILLARD J. FAULKNER

BY

Lockwood, Galt, Woodard, & Smith
ATTORNEYS 2,942,488

PHONOGRAPH DRIVE MECHANISM

Willard J. Faulkner, Coloma, Mich., assignor to V-M Corporation, Benton Harbor, Mich., a corporation of Michigan Filed June 19, 1956, Ser. No. 592,467

7 Claims. (Cl. 74—208)

The present invention relates to a phonograph and tape recorder drive mechanism, and more particularly to a driving mechanism adapted to rotate the turntable of a phonograph or capstan of a recorder.

With the growing popularity of automobile phonographs, certain problems are encountered, among which is the one of providing a suitable motor drive which is actuated by the automotive electrical power source. Conventionally, this power source is the automobile battery of either the six (6) or twelve (12) volt size. The electric motors used in such phonographs must, of course, be small in size but yet they must deliver uniformly smooth rotation, since non-uniform rotation produces "flutter" or "wow" in the reproduction of a record.

The usual electric motor which is powered by a battery or other source of direct current voltage does not rotate smoothly, but instead pulsates in its rotation in accordance with the generation of the electromagnetic field. Thus, a direct drive between a turntable and such a motor results in the undesirable "flutter" and "wow" characteristics mentioned hereinabove.

It is therefore an object of this invention to provide a driving mechanism especially adapted to rotate a turntable or capstan at a constant, uniform speed.

It is another object of this invention to provide a turntable driving mechanism which may be used with an electric motor of pulsating speed to drive a turntable at uniform speed.

Other objects will become apparent as the description proceeds.

To the accomplishment of the above and related objects, my invention may be embodied in the forms illustrated in the accompanying drawings, attention being called to the fact, however, that the drawings are illustrative only, and that specific change may be made in the specific constructions illustrated and described, so long as the scope of the appended claims is not violated.

Figure 2:
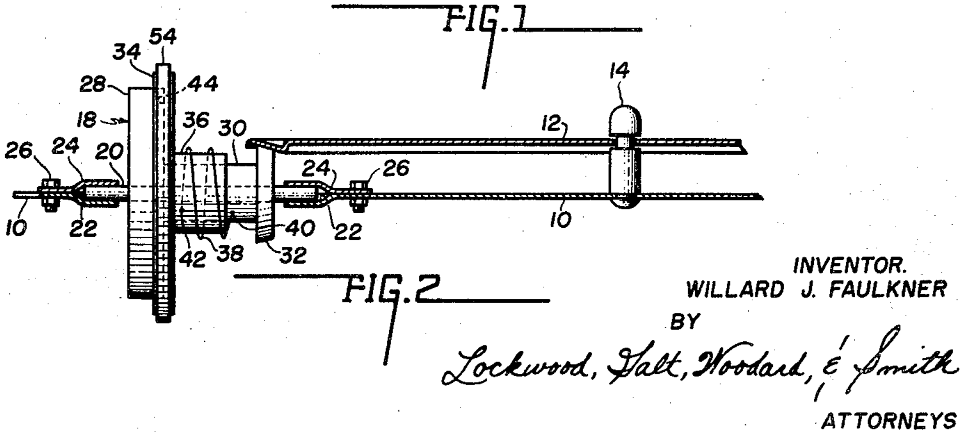
Fig. 2 is a sectional view taken substantially along section line 2—2 of Fig. 1.

Referring to the drawings, a chassis 10 rotatably supports a turntable 12 which rotates in the usual manner about a spindle 14 suitably secured to the chassis 10. Journaled in a cutout portion 16 of the chassis 10 is an idler wheel assembly generally indicated by the reference numeral 18. This assembly comprises an axle or shaft 20 which is secured to the chassis by means of suitable indentations 22 pressed into the chassis and clamps 24 which are secured to the chassis by means of suitable screw assemblies 26. It will be noted from viewing Fig. 2 that the axis of shaft 20 lies substantially in the plane of the chassis 10.

Rotatably mounted on the shaft 20 is a fly-wheel or inertia wheel 28 which is relatively large and heavy in comparison to the other parts of the assembly. On this fly-wheel 28 is a hub 30 to which is secured a drive-wheel 32. This drive-wheel frictionally engages the underside of the outer peripheral margin of the turntable 12 so that rotation of the fly-wheel 28 produces corresponding rotation of the turntable 12.

Rotatably mounted on the hub 30 of the fly-wheel 28 is an idler wheel 34 having a tubular bearing extension 36. This idler wheel combination 34, 36 is freely rotatable about the axis of the shaft 30 with respect to the fly-wheel combination 28, 30. Thus, the idler wheel 34 and fly-wheel 28 are relatively rotatable.

A torsion spring 38 surrounds the hub and bearing assembly 30, 36 and is fastened at one end 40 to the hub 30 and at the other end 42 to the bearing 36, as indicated. The spring 38 is loosely coiled so as to provide for relative rotation between the idler wheel 34 and fly-wheel 28 to an extent about equal to one complete turn of the spring 38. The direction of coiling of the spring 38 is such that the normal direction of rotation of the idler wheel 34 will tend to wrap the spring more tightly around the hub 30, 36 if the fly-wheel 28 is held stationary. However, with the spring 38 properly wound, it will serve as a shock absorber or pulsation remover whereby pulsations or shocks imparted to the idler wheel 34 will not be transmitted to the fly-wheel 28.

The idler wheel 34 is slightly larger in diameter than the fly-wheel 28 and is recessed at 44 to partially receive the fly-wheel 28.

A direct current motor 46 of the conventional type capable of running on either a six (6) or twelve (12) volt storage battery is mounted on a suitable trunnion 48 which is supported directly from the chassis 10. This motor is capable of pivotal action around the trunnion axis 48 which is vertical so that the tension spring 50, which is connected between the rear of the motor and the chassis for urging the motor in a counterclockwise direction, will urge the motor spindle into contact with the rubber tire 54 on the periphery of the idler wheel 34. Thus, energization of the motor 46 will serve to rotate the spindle 52 and also the fly-wheel 34.

In operation, the motor 46 is energized to cause rotation of the spindle 52. The spring 50 causes frictional contact of the spindle 52 with the rubber rim 54 of the idler wheel 34. The rotation of the spindle is thus imparted to the idler wheel. As the idler wheel 34 starts rotating, the torsion spring 38 tends to wrap more tightly, thereby imparting a force of rotation to the hub 30. This, in turn, causes rotation of the fly-wheel 28 and drive-wheel 32 for causing corresponding rotation of the turntable 12. Thus, it will appear that the rotary motion of the motor 46 is effectively transmitted by means of the torsion spring 38 to the turntable.

As explained earlier, direct current motors do not rotate smoothly, but instead pulsate according to the production of the electromagnetic motor field. These pulsations, if transmitted directly, would result in uneven or irregular pulsating rotation of the turntable 12, which would be evidenced by a sound commonly characterized as "flutter" or "wow." In other words, the sound produced by a record being played would be unnatural and unfaithful, and therefore would not be acceptable. However, by the interposition of the torsion spring 38 between the relatively movable wheels 34 and 28 in combination with fly-wheel 28, the sudden pulsations or inconsistencies of rotation in the motor spindle 52 are effectively smoothed out or removed, whereupon the motion directly transmitted to the turntable 12 is smooth and uniform. Thus, it is possible to use a relatively inexpensive and pulsating motor 46 in a phonograph mechanism wherein it is necessary that the turntable be rotated at a uniform angular velocity. It will, of course, be obvious to a person skilled in the art that the fly-wheel 28 must possess the proper inertia to smooth out the pulsations of the motor; this inertia size, of course, being dependent upon the dimensions and speed of rotation of the other mechanism parts.

Figure 1:
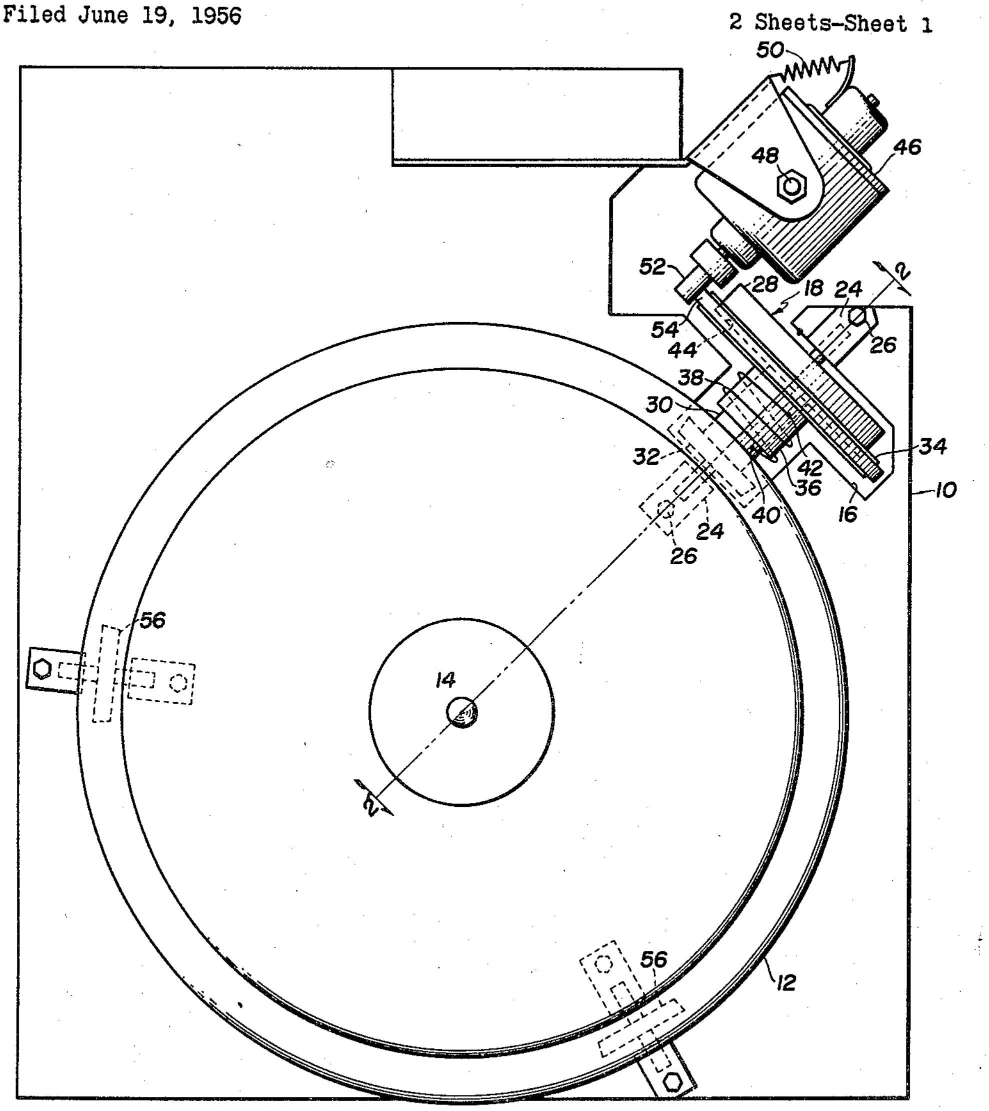
Fig. 1 is a fragmentary top plan view of a phonograph mechanism of this invention.

As seen in Fig. 1, the turntable 12 actually rests on two rotatable supporting wheels 56 spaced approximately 120° from the drive-wheel 32, these wheels 56 being supported in the plane of the chassis 10 in a manner similar or substantially identical to the shaft mountings 22, 24 of the driving mechanism 18.

Figure 3:
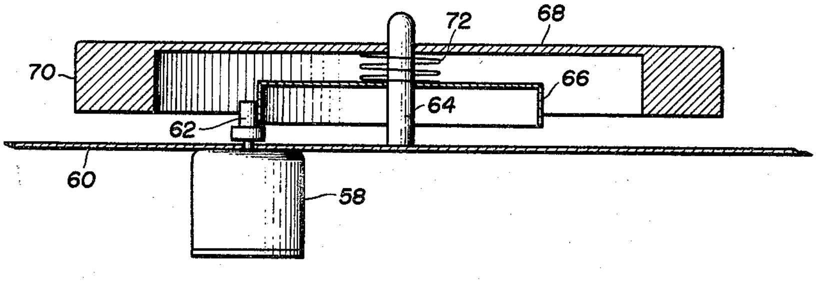
Fig. 3 is a diagrammatic sectional illustration of a second embodiment of this invention.

Referring now to Fig. 3, a second embodiment of this invention is illustrated in diagrammatic form. A motor 58 like the motor 46 of Fig. 1 is mounted on a chassis 60 with the shaft 62 aligned vertically. A supporting post 64 is secured to the chassis in an upright position, and receives thereon for rotation an idler wheel 66 which may be fabricated from ordinary thin gauge sheet metal. Also rotatably mounted on the post 64 is a weighted turntable 68 having an annular weight 70 depending from the perimeter. The purpose of the weight is to add mass to the turntable for increasing uniformity of rotation. A helical spring 72 similar to spring 38 of Fig. 1 is coupled between the turntable and the idler 66 for imparting idler rotation to the turntable. By means of the engagement between motor shaft 62 and the perimeter of idler 66, energization of the motor results in rotation of the turntable. Motor-field undulations and the like are effectively dampened by the spring 72 and the annular weight 70 whereby the turntable is rotated at a uniform, constant speed.

While the drawings and description have been directed principally to mechanism for playing disc-type phonograph records, it is intended to include within the scope of this invention similar mechanisms especially adapted for use in tape and wire recording and playing apparatuses. The only essential change required in order to adapt the driving mechanisms of Figs. 1 and 3 to tape and wire apparatuses is replacing the turntables 12 and 68 with the usual capstans which serves in driving the tape or wire. Also, if it is desired to retain the mass characteristics of the turntable 68, a capstan may be concentrically secured thereon. While the word "turntable" is used in the claims in numerous instances, it will appear as obvious that wire or tape machine capstans constitute equivalent structures.

What is claimed is:

1. For use in a phonograph mechanism, a turntable driving mechanism comprising a supporting plate-like chassis, a turntable rotatably mounted on said chassis, an idler wheel assembly mounted on said chassis for rotation about an axis disposed substantially within the plane of said chassis; said idler wheel assembly comprising a drive-wheel which frictionally engages the underside of said turntable for turning the same, a hub secured at one end to said drive-wheel, an inertia wheel secured to the other end of said hub for driving said drive-wheel, an idler wheel mounted on said hub for rotation about said axis with respect to said inertia wheel and being recessed to receive said inertia wheel therein, a torsion spring coiled around said hub and yieldably connecting the hub to said idler wheel whereby rotation of said idler wheel will be imparted to said hub by means of said spring causing corresponding rotation of said inertia wheel and said drive-wheel; and a motor driveably connected to said idler wheel for rotating the same.

2. For use in a phonograph mechanism, a turntable driving mechanism comprising a supporting plate-like chassis, a turntable rotatably mounted on said chassis, an idler wheel assembly mounted on said chassis for rotation about an axis disposed substantially within the plane of said chassis; said idler wheel assembly comprising a drive-wheel which frictionally engages the underside of said turntable for turning the same, a hub secured at one end to said drive-wheel, an inertia wheel secured to the other end of said hub for driving said drive-wheel, an idler wheel mounted on said hub for rotation about said axis with respect to said inertia wheel and being recessed to receive said inertia wheel therein, and a torsion spring coiled around said hub and yieldably connecting the hub to said idler wheel whereby rotation of said idler wheel will be imparted to said hub by means of said spring causing corresponding rotation of said inertia wheel and said drive-wheel.

3. For use in a phonograph mechanism, a turntable driving mechanism comprising a supporting plate-like chassis, a turntable rotatably mounted on said chassis, an idler wheel assembly mounted on said chassis for rotation about an axis disposed substantially within the plane of said chassis; said idler wheel assembly comprising a drive-wheel which frictionally engages the underside of said turntable for turning the same, a hub secured at one end to said drive-wheel, an inertia wheel secured to the other end of said hub for driving said drive-wheel, an idler wheel mounted on said hub for rotation about said axis with respect to said inertia wheel and being recessed to receive said inertia wheel therein, a yieldable connection interconnecting said hub and said idler wheel for imparting rotation of said idler wheel to said inertia wheel.

4. For use in a phonograph mechanism, a turntable driving mechanism comprising a supporting plate-like chassis, a turntable rotatably mounted on said chassis, an idler wheel assembly mounted on said chassis for rotation about an axis disposed substantially within the plane of said chassis; said idler wheel assembly comprising a drive-wheel which frictionally engages the underside of said turntable for turning the same, an inertia wheel secured to said drive-wheel for rotation therewith, an idler wheel coaxially mounted on said inertia wheel for rotation with respect thereto, and a yieldable means interconnecting said inertia wheel and said idler wheel for imparting rotation of said idler wheel to said inertia wheel.

5. For use in a phonograph mechanism, a device for transmitting rotation of a motor to a turntable comprising an idler wheel, an inertia wheel and a drive-wheel, said inertia wheel and said drive-wheel being rigidly connected together for rotation about a common axis, a torsionally resilient element connecting said idler wheel to said inertia wheel, a driving connection between the motor and idler wheel whereby rotation of said idler wheel is imparted to said drive-wheel, and a turntable drivably coupled to said drive-wheel.

6. For use in a sound reproducing mechanism, a device for transmitting rotation of a motor to a rotatable member comprising an idler wheel, an inertia wheel and a drive-wheel for said rotatable member, said inertia wheel and said drive-wheel being rigidly connected together for rotation about a common axis, a torsionally resilient element connecting said idler wheel to said inertia wheel, a driving connection between the motor and idler wheel whereby rotation of said idler wheel is imparted to said drive-wheel.

7. For use in a sound reproducing mechanism, a device for transmitting rotation of a motor to a rotatable member comprising an idler wheel, an inertia wheel and a drive-wheel for said rotatable member, said inertia wheel and said drive-wheel being rigidly connected together for rotation about a common axis, torsionally yieldable means connecting said idler wheel to said inertia wheel, a driving connection between the motor and idler wheel whereby rotation of said idler wheel is imparted to said drive-wheel.

References Cited in the file of this patent

UNITED STATES PATENTS

| | | |
|---|---|---|
| 1,096,720 | Howery | May 12, 1914 |
| 1,535,639 | Weber | Apr. 28, 1925 |
| 2,244,121 | Schneider | June 3, 1941 |
| 2,647,408 | Manning | Aug. 4, 1953 |